United States Patent

[11] 3,542,442

[72] Inventor Bryan P. Kent
    Ithaca, New York
[21] Appl. No. 781,806
[22] Filed Dec. 6, 1968
[45] Patented Nov. 24, 1970
[73] Assignee Borg-Warner Corporation
    Chicago, Illinois
    a corporation of Delaware

[54] VENTED MECHANICAL DEVICE
    1 Claim, 1 Drawing Fig.
[52] U.S. Cl. .................................................. 308/187
[51] Int. Cl. ...................................................... F16c 1/24
[50] Field of Search .......................................... 308/187,
    187.1, 187.2

[56] References Cited
    UNITED STATES PATENTS
    3,439,963 4/1969 Hein et al. ..................... 308/187

Primary Examiner—Fred C. Mattern, Jr.
Assistant Examiner—Frank Susko
Attorneys—Donald W. Banner, Lyle S. Motley, C. G. Stallings and William S. McCurry ABSTRACT: An overrunning clutch is disclosed herein providing a structure whereby a drive and driven member are interconnected to provide a driving situation therebetween in one direction and an overrunning situation therebetween in the other direction. Substantial temperature gradients are created during operation of the clutch, particularly during the overrunning situation. Seals are provided to retain lubricant in the bearings which rotatably interconnect the drive and driven members of the clutch. The clutch is provided with a vent structure to vent the bearing enclosure during overrunning conditions.

Patented Nov. 24, 1970
3,542,442
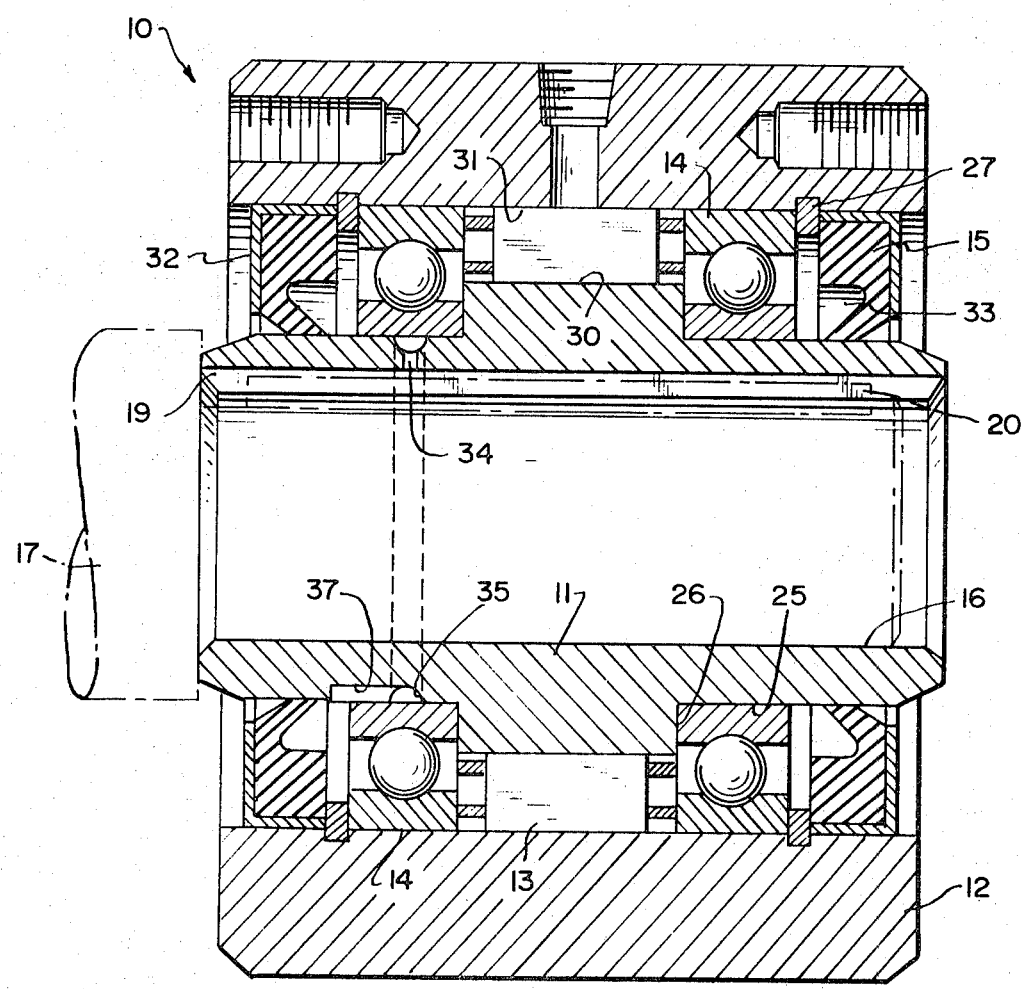
INVENTOR
BRYAN P. KENT
BY *Evan D. Roberts*
ATTORNEY

VENTED MECHANICAL DEVICE

SUMMARY OF THE INVENTION

This invention relates to a rotational device adapted to be mounted on a shaft wherein a first member is mounted on the shaft and a second member is rotatably mounted on bearings on the first member. The bearings are contained in a lubricant chamber provided by seals that extend from the first to the second member longitudinally beyond the bearings. The first member is provided with an annular groove in the periphery thereof and enclosed under the bearing. A longitudinal peripheral slot is provided in the first member and is circumferentially spaced from the keyway in the first member and extends longitudinally beyond the bearing to communicate with the bearing enclosure to vent the enclosure.

The FIG. shows a sprag cam clutch with the novel venting structural arrangement.

A cam clutch generally represented by the numeral 10 is illustrated in the FIG. for the purpose of describing the invention. The clutch 10 includes, among other things, an inner race member 11, an outer race member 12, sprags 13, bearings 14 and seals 15. The inner race 11 is provided with a shaft passage 16 adapted to receive a drive shaft 17 and a keyway 19 adapted to receive a key 20 supported in the keyway 19 and in the shaft 17 for locking the inner race 11 to the shaft. The bearings 14 are supported on an outer surface 25 of the inner race 11 against shoulders 26 extending radially outward. The outer race 12 is mounted on the bearings 14 and is thereby rotatably mounted on the inner race 11 and is held against longitudinal motion by rings 27 positioned in grooves in the outer race 12. The sprags 13 are positioned between a circumferential surface 30 of the inner race 11 and an internal surface 31 of the outer race 12 that is substantially concentric with the surface 30 of the inner race 11.

The sprags 13 can have any one of many configurations normally utilized in cam clutches and for purposes of illustrating this invention the sprags are of the type which are cammed into engagement with the surfaces 30 and 31 of the inner and outer races to provide a drive therebetween when a load is applied to the outer race 12 and the drive shaft 17 is rotated in one direction but, which will not provide such drive connection when the drive shaft 17 is rotated in the other direction. In the former, the typical drive is provided by a cam clutch as illustrated, and in the latter, there is the typical overrunning effect as illustrated. A lubricant (not shown) is provided for the bearings 14 and the sprags 13 and is retained by the seals 15 held in position by retaining casings 32 press fitted or otherwise secured to the inner surface 31 of the outer race 12. It should be noted that the seals 15 provide a bearing and sprag lubricant enclosure 33 for the purpose of retaining the lubricant in the area of the bearings 14 and sprags 13.

The present invention has an improved venting structure in the lubricant enclosure. In particular, the inner race 11 of the clutch 10 has a small passage 34 formed therein interconnecting a groove 35 on the outer surface 25 with a passage such as the keyway 19. The groove 35 is connected to the lubricant enclosure 33 by a longitudinal slot 37. It should be noted that the slot 37 is substantially circumferentially spaced from the passage 34.

In the operation of the invention, the drive shaft 17 may be rotated in one direction to provide driving connection between the inner and outer races 11 and 12, or it may be driven in the other direction without a driving connection in an overrunning effect. In the latter case, the friction in the bearings 14 and other adjacent rotating elements positioned between the inner and outer members will cause the temperature of the lubricant and the surrounding air in the enclosure 33 to rise and the lubricant to expand.

Ordinarily, the expansion of the lubricant in the air in the chamber 33 will tend to force oil between the inner race surface 35 and the seals 15 to cause rupture or leakage of the seals, and eventual loss of lubricant. However, in this invention, expanding air in the enclosure 33 may escape through the inner race by passing through slot 37, groove 35, radial passage 34 and longitudinal passage 19 to the atmosphere to relieve the pressure within the enclosure. Similarly, air may be drawn from the atmosphere into the enclosure when the lubricant and air in the enclosure tend to contract due to cooling off of the clutch during less severe use.

It should be noted that the passage 34 is directed radially inward into the keyway 19 so that centrifugal action during the relative rotation of the inner and outer races 11 and 12 cannot cause lubricant to be forced through the passages 34 and 19. The lubricant will be forced radially outward allowing only air to pass radially inward through the passage 34. Also, inasmuch as the passage 34 is formed in the inner race and extends radially inward and can only vent through the keyway 19 which is not otherwise connected with the chamber 33, lubricant below a certain level in the cam clutch lubricant enclosure 33 will not run out of the enclosure under the force of gravity when the inner race 11 is stopped with the passage 34 in the down position which is opposite to the position shown.

Further, it should be noted that groove 35 in the inner race 11 is positioned entirely under the bearing 14 so that the only lubricant that may pass therein must pass through the slot 37. The slot 37 is necessarily of substantially small circumferential dimension so that substantially all the oil passing radially inwardly along the surface of the bearing 25 will flow over the surface 25 of the inner race member 11 to the bottom of the clutch with only a chance of a minute amount of oil passing into the slot 37 and out of the clutch through keyway 19.

Thus, the present invention is provided with a lubricant enclosure vent by virtue of the novel inner race structure having a longitudinal passage 19, passage 34, groove 35, and slot 37.

It is to be understood that the invention is not to be limited to the specific constructions and arrangements shown and described, as it will be understood to those skilled in the art that changes may be made without departing from the principles of the invention.

I claim:

1. A rotational device adapted to be mounted on a keyed shaft comprising a first member having a passage formed therein for receiving the shaft, a second outer member positioned around said first member, bearing means for rotatably supporting said second member on said first member, and seal means extending between said first and second members for enclosing said bearing means between said first and second members, said first member having a keyway formed therein opening into the shaft passage and extending axially to the end of the first member, said first member having a single annular groove formed in the periphery thereof and longitudinally positioned entirely under one of said bearing means, said first member having a radial passage formed therein in the bottom of said annular groove at one peripheral point thereof adjacent said keyway and connecting said keyway and said groove, said first member having a longitudinal slot formed in the periphery thereof and circumferentially spaced from the radial passage thereof and extending longitudinally beyond said bearing to communicate with the bearing enclosure.